3,215,622
ION EXCHANGE PROCESS
Herbert N. Dunning, St. Paul, Minn., Maurice M. Kreevoy, Headington, Oxford, England, and James M. White, Minneapolis, Minn., assignors to General Mills, Inc., a corporation of Delaware
Filed July 24, 1963, Ser. No. 297,277
12 Claims. (Cl. 210—21)

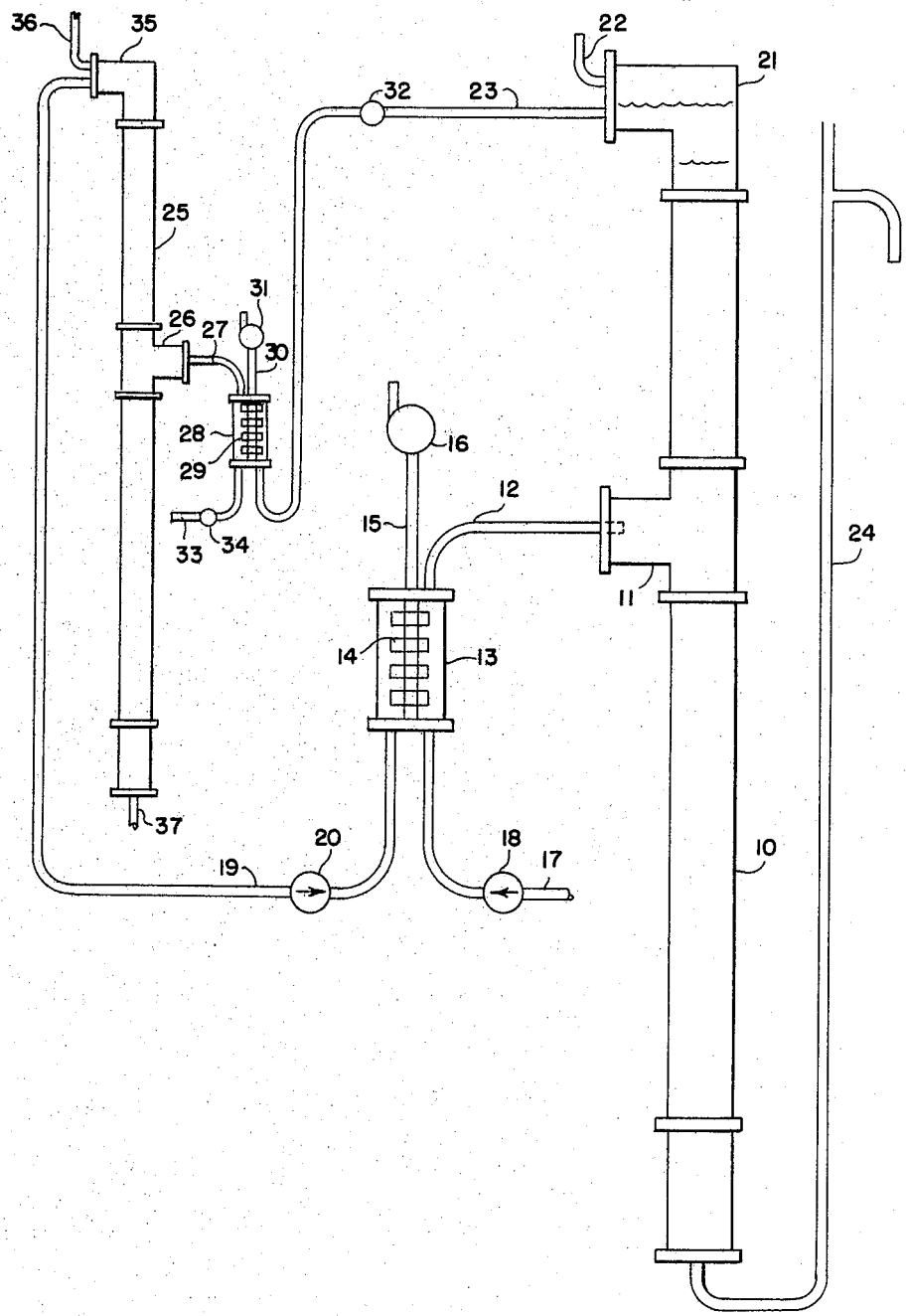
INVENTORS
MAURICE M. KREEVOY
HERBERT N. DUNNING
JAMES M. WHITE
BY
AGENT United States Patent Office 3,215,622
Patented Nov. 2, 1965

This application is a continuation-in-part of application Serial No. 105,807 filed April 26, 1961, and now abandoned.

This invention relates to a process of treating aqueous solutions to remove and/or recover organic anionic detergents therefrom. More particularly, it relates to a novel method for the treatment of detergent-laden wastes.

The removal of surface active materials is of particular interest in the treatment of sewage and industrial wastes. The separation of surfactants from sewage has recently become more acute with the wide-spread use of anionic detergents, particularly of the alkyl aryl sulfonate type. Unlike the previously used soaps, these detergents are not readily consumed by bacteria and other organisms. Accordingly, when sewage containing an alkyl aryl sulfonate is discharged into a river or lake or disposed of underground, the alkyl aryl sulfonate becomes a more or less permanent addition to the body of water. In rivers, the amount of detergent builds as the river flows past communities discharging detergent containing sewage. In many parts of this country, lakes and ground water are already contaminated with detergents. In most sections of the country, this problem is presently not acute. However, the levels of detergent in these bodies of water will continue to grow, and in the future, will present a hazard not only to drinking water for human consumption, but also to fish and other life dwelling in our lakes and rivers. Further, it may render the water unuseable in many present commercial operations. At the present time in some localities of the country the level of detergent in the available water supply is sufficiently high to affect adversely the foaming properties of beer made therefrom. In anticipation of the continuing build up of detergents, some breweries are considering processes for removing detergent from their water supply. This is just one example of many industries whose products or processes require water of high purity.

In the United States, launderettes have become quite popular. If the detergents were removed from the sewage of laundries and laundromats, the amount of contamination of water supplies would be considerably reduced. In addition to this immediate problem, is the treatment of the entire sewage and industrial wastes of factories and communities.

There has been very little success in adapting known separative processes to the removal of detergents and other surfactants from sewage and industrial wastes. This is primarily because of the large volumes of material to be handled and the low concentration of detergents. In order for any method to be practical, there must be a very low cost per unit of material treated. The difficulties in adapting known separative processes to sewage treatment are illustrated by considering a process such as solvent extraction. This proceses has been mentioned in the prior art as a method of purifying sewage by removal of greases and other organic-soluble materials. In a solvent extraction process large amounts of solvents are generally required. In many cases these solvents present hazards of fire and explosion. Low volatility solvents often do not provide the necessary extraction efficiency. There are also the problems of the contamination of the treated material with the extracting solvent and the expense involved in the attrition of the solvent. Perhaps the greatest difficulty with solvent extraction is the cost of separating the solvent and the extracted materials. Generally, distillation or some other expensive process is required.

A method which has also been suggested for the treatment of waste water is the foam fractionation method. Using this technique, liquids containing surface active compounds are foamed by passing a gas through the liquid. The foam is then recovered and condensed. It is found that the concentration of the surface active agents is higher in the condensate than in the residual liquid or the original feed solution. The difficulty with the foam fractionation process is that considerable equipment is required to handle and condense the large amounts of foam which are produced. In addition, the treatment generally requires several treating stages in order to remove a substantial portion of the surface active material. While this method is particularly suited to quite dilute solutions, when the solution becomes so dilute that it does not foam readily, additional removal of surface active agents becomes difficult and expensive. Even under the best conditions the removed surfactant is diluted by large amounts of water.

Froth flotation has also been employed to remove suspended particles from aqueous solutions. Froth flotation has sometimes been confused with foam fractionation, but the two are very different in principle. In froth flotation, the particles are treated to make them hydrophobic and then are removed from the water by being attached to rising bubbles of air.

Emulsion fractionation has also been considered for sewage treatment, although the process is notoriously expensive. This technique involves mixing an aqueous phase and an immiscible organic phase to form an emulsion. When the emulsion is partially broken, the concentration of surface active materials in the emulsion phase is greater than in either the aqueous or the organic liquid phase. By separating the emulsion phase and breaking the emulsion, a concentration of the interfacially active compounds will be found.

From the above discussion, it should be apparent that it would be highly desirable to provide a process for the separation of detergents from aqueous waste solutions, particularly sewage and launderette effluents, which would overcome all or a substantial proportion of the deficiencies in the known prior art processes.

It is therefore, an object of this invention to provide a novel method of removing and/or recovering organic anionic detergents from aqueous solutions.

Another object of the invention is to provide such a method for the treatment of sewage and launderette effluents.

These and other objects will become apparent from the following detailed description.

Broadly stated, the process of the present invention comprises the steps of admixing an aqueous solution containing organic anionic detergent(s) with an organic phase comprising a water-immiscible organic solvent and an amine anion exchange material to extract at least a portion of the organic anionic detergent(s) into the organic phase and separating the organic phase from the aqueous phase. The aqueous solution and organic phase are preferably mechanically agitated during the contacting step. The separated organic phase can be treated to strip the extracted organic anionic detergent(s) therefrom. The organic phase can then be recycled for further extractions where desired and the stripped organic anionic detergent(s) can be concentrated and recovered.

The broad process is illustrated as follows. Sewage water commonly contains from about 2 to 20 parts per million of anionic detergents, primarily sodium alkyl aryl sulfonates. Such sewage water is contacted (with or without pH changes) with an organic phase comprising kerosene, or other water-immiscible organic solvent, and an amine anion exchanger, such as a fatty amine. The anionic sulfonates form a complex with the anion exchanger and are extracted into the organic phase which is then separated from the aqueous phase. The complex being oil soluble is in the organic phase. Although we are not certain of the exact structure of the complex, the reaction may be expressed as follows for illustration purposes:

$(R_1R_2R_3N)_{org.} + (R'SO_3^-)_{aq.} + (H^+)_{aq.}$
$\rightarrow (R_1R_2R_3NH^+R'SO_3^-)_{org.}$ where $R_1$, $R_2$ and $R_3$ are alkyl groups, for example, and R' is an organic radical such as an alkyl or alkyl aryl radical. The organic phase is separated from the aqueous phase by conventional procedures such as decantation. As indicated above, the organic phase can then be stripped such as by washing with caustic. It is theorized that the stripping reaction is as follows:

$(R_1R_2R_3NH^+R'SO_3)_{org.} + (OH^-)_{aq.}$
$\rightarrow (H_2O)_{aq.} + (R'SO_3^-) + (R_1R_2R_3N)_{org.}$ Alternatively, the anionic detergent may be stripped from the separated organic phase by the use of other materials such as salts. The anionic detergent in the aqueous stripping solution may be concentrated and recovered for further use as a detergent.

A wide variety of amine anion exchange materials are useful in the process of the present invention. The term "anion exchange material" as used herein refers to ion exchange materials which are capable of exchanging anionic materials. Ion exchange materials are commonly designated by the type of ion which is absorbed, rather than by the chemical properties of the ion exchange material. Accordingly, anion exchange materials could be cationic compounds. The types of materials useful in the present invention are those anion exchange materials, commonly referred to as "liquid ion exchange materials." The "liquid" refers to the fact that these ion exchange materials are used in solution rather than in a solid state as is the case with ion exchange resins. Many of the liquid ion exchange materials are liquids at room temperature, while others are normally solid materials. When the solid materials are dissolved in a suitable solvent, there is formed a solution which has ion exchange properties.

The preferred anion exchange materials are the water-immiscible amines. With respect to these materials, several observations are in order. Amines which have a fairly high degree of insolubility in water are generally preferred since this will aid in preventing attrition of large amounts of amine. Consequently, it is preferred to employ materials having more than about 10 carbon atoms and even more preferred to employ materials having more than about 20 carbon atoms. As between the primary, secondary, and tertiary amines, the secondary amines are preferred. The secondary amines are generally less soluble in water than the primary amines and are usually more effective extractants. The tertiary amines are also good extractants, however they are often more expensive and somewhat more difficult to prepare than the secondary amines. One advantage that the amines possess is that they can be readily stripped and reused. The loaded ion exchange solution need not be recirculated, but can be used as a fuel or for some other end use.

Specific examples of the above type compounds which are useful in the present invention include those set forth in the examples to follow and lauryl amine, myristyl amine, palmityl amine, stearyl amine, olelyl amine, linoleyl amine, laurylmethyl amine, myristylmethyl amine, palmitylmethyl amine, stearylmethyl amine, oleylmethyl amine, linoleylmethyl amine, dilauryl amine, dimyristyl amine, dipalmityl amine, distearyl amine, dioleyl amine, dilinoleyl amine, trilauryl amine, trioctyl amine, dilaurylmethyl amine, distearylmethyl amine, dioctyl amine, di- benzyl amine, diisooctyl amine, benzyllauryl amine, 3-phenylpropyltetradecyl amine, trioctyl amine, triisooctyl amine, benzyldilauryl amine, dibenzylmethyl amine, β-hydroxyethyldilauryl amine, β-hydroxydodecyl dinonyl amine, decylpiperidine, lauryl morpholine, octadecyl morpholine, bis (1-isobutyl-3,5-dimethylhexyl) amine, bis (3,5,7-trimethyl octyl) amine, 6-benzyl amino-3,9-diethyl tridecane and N-lauryl-1,3-propylene diamine. Most of these preferred compounds are represented by the formula:

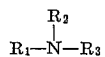

where $R_1$ is an aliphatic or aromatic radical of 6 to 24 carbon atoms and $R_2$ and $R_3$ are hydrogen or hydrocarbon radicals of 1 to 24 carbon atoms. Compounds containing acetylenic unsaturation are generally not used as liquid ion exchange reagents because of the difficulty of preparation and because of their cost. However, if desired such nonpreferred agents can be employed.

Another group of materials which is useful in the present invention are the hydroxy fatty nitrogen compounds which have two nitrogen containing groups, one of which is situated on a carbon atom adjacent to a hydroxyl group, the other situated in a group occupying a terminal position. Commercially, these materials are prepared from oleic acid and accordingly have 18 carbon atoms in the main carbon chain. However, they may also be derived from other lower or higher molecular weight unsaturated acids. Because of the method of preparation, these materials are usually mixtures of isomers. Generally, the isomers are not separated for most commercial uses. Specific examples of such materials include 9-amino-10-hydroxystearonitrile,
9-dimethylamino-10-hydroxystearonitrile,
9-anilino-10-hydroxystearonitrile,
9-morpholino-10-hydroxystearonitrile,
10-dodecylamino-9-hydroxystearonitrile,
10-meta-aminophenylamino-9-hydroxystearonitrile,
9-diethanolamino-10-hydroxystearyl amine,
10-β-aminoethylamino-9-hydroxystearyl amine,
9-dodecylamino-10-hydroxystearyl amine,
9-(β-cyanoethyl)-amino-10-hydroxystearonitrile,
10-N-(β-cyanoethyl)-dodecylamino-9-hydroxystearonitrile,
9-(gamma-aminopropyl)-methylamino-10-hydroxystearylamine,
9-(gamma-aminopropyl)-anilino-10-hydroxystearylamine,
9-morpholino-10-hydroxystearyl morpholine, and
9-dimethylamino-10-hydroxystearyldimethyl amine.

These materials are represented by the formulas:

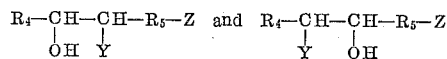

where $R_4$ and $R_5$ are aliphatic hydrocarbon radicals of 1 to 22 carbon atoms and the total number of carbon atoms in $R_4$ and $R_5$ is 6–22, Y is an amino radical and Z is an amino radical or nitrile.

The preferred organic solvents for the process of the present invention are the hydrocarbons. Examples of suitable hydrocarbon solvents include isooctane, kerosene, "Soltrol 170" (a commercially available naphthenic hydrocarbon solvent) benzene, toluene, xylene, isodecane, fuel oils, mineral oils, hexane, heptane, and octane. Chlorinated hydrocarbons such as chloroform can be used. Solvents which contain functional groups can also be employed in the present invention, providing that the functional groups do not adversely affect the extraction, and provided that the molecular weight is sufficiently high so as to make the organic solvents substantially insoluble in water. Illustrative of such compounds are the alcohols, aldehydes, ketones, and esters such as naturally occurring vegetable oils. The term "water-immiscible organic solvent" as used herein refers to an organic material normally liquid which is substantially, but not necessarily entirely, insoluble in water.

The process of the present invention can be used to treat aqueous waste solutions containing organic anionic detergents regardless of the source of such waste solutions. Any detergent which exhibits anionic properties can be removed from the waste solutions by our process. In some cases, certain detergents may be cationic or exhibit amphoteric properties under certain conditions, but if they exhibit anionic properties in the process of the present invention, they will be considered as anionic detergents for purpose of the present invention. Examples of detergents which can be removed by the process of the present invention include the alkyl aryl sulfonates such as sodium dodecylbenzenesulfonate, sodium xylene sulfonate, sulfonated gylcerines, the alkyl alcohol sulfates such as sodium lauryl sulfate. Still other detergents which can be separated by the process of the present invention include diisobutyl sodium sulfosuccinate, alkyl naphthalene sodium sulfonate, sulfonated castor oil, sulfonated tall oil, sulfonated petroleum residuals, salts of sulfated fatty acid ester, sodium ligno sulfonate, sodium lauryl sulfoacetate, sodium salt of alkyl aryl polyether sulfonate, ammonium salt of sulfate ester of an alkyl phenoxy polyethanol, sodium salt of a sulfonated naphthalene-formaldehyde condensate, triethanolamine alkyl aryl sulfonate, and ammonium tridecyl benzene sulfonate. The process of our invention is particularly valuable for treating waste solutions containing sulfonate and/or sulfate detergents. When present, soaps, such as sodium stearate, are also at least partially removed by our process.

The first step in the process involves the contacting of the aqueous waste solution containing the organic anionic material with the organic phase comprising the water-immiscible organic solvent and the amine anion exchange material. The volume phase ratio of the aqueous phase to the organic phase can vary widely depending on materials, concentrations, conditions, etc., but will generally be within the range of about 1:1 to 500,000:1 and preferably in the range of about 30:1 to 1000:1. The amount of anion exchange material in the organic phase also can be varied over wide limits but is preferably in the range of about 1.0 to 50.0 wt. percent. As indicated above the aqueous phase and organic phase are preferably agitated during the contacting step.

In some operations the aqueous waste solution is desirably acidified before the extraction step, preferably to a pH value below about 6.5 and desirably below about 6.0. Sulfuric acid, or any similar acid material may be used for this purpose. In other instances the aqueous waste solution is treated without adjustment of the pH.

After the extraction step, the water-immiscible organic phase is separated from the aqueous phase by virtue of their immiscibility. The aqueous phase is substantially free of organic anionic detergents and can be reused or disposed of without causing the serious pollution problems referred to above. In addition to removing organic anionic detergents from aqueous waste solutions, our process also at least partially removes various other materials such as inorganic anionic materials including phosphates, polyphosphates, borates, nitrates, nitrites, sulfates and the like. Such materials are commonly included in commercial detergent formulations as builders, brighteners and the like.

Where it is desired to recover the organic anionic material from the organic phase and/or reuse the organic phase, the loaded amine anion exchange material can be stripped by treatment with a material which may be an aqueous basic solution or electrolyte, or certain acidic materials. Exemplary stripping solutions include solutions of sodium hydroxide, calcium hydroxide, barium hydroxide, soda, lime ammonium hydroxide-ammonium chloride buffer, sodium carbonate, disodium hydrogen phosphate-sodium biphosphate buffer, ammonium acetate, sodium bicarbonate-sodium chloride mixture, methylamine, sodium perchlorate, calcium chloride, hydrochloric acid, sulfuric acid and the like. Emulsion formation during the stripping can be effectively countered by the addition of small amounts of additives such as isopropyl alcohol, n-decyl alcohol, dodecyl phenol, silicone fluids and other de-emulsifying agents. In addition to these solutions, solid stripping agents, usually of a caustic nature such as sodium, calcium and barium hydroxides, soda, and the like may also be used. The organic anionic materials can be discarded along with the stripping agents or solutions or they can be recovered, where desired, from such agents or solutions. The stripped organic phase can be recycled for use in the extraction step.

The process of the present invention can be carried out over a wide variety of temperatures. Generally, it is preferred to carry out the process at temperatures in the range of 25 to 75° C. The temperature limits are governed by the freezing and boiling points of the liquid phases.

Our process can also be carried out continuously. Thus the aqueous waste solution and organic phase can be contacted at predetermined rates and separated continuously. If desired, the loaded organic phase can be stripped and the organic phase then recycled continuously for use in the extraction step.

A system for continuous extraction of organic anionic detergents from aqueous solutions is shown schematically in the single figure of the drawing. The system includes an elongated vertical column 10 provided with a T-connector 11 intermediate of its ends which functions as a material inlet. Inlet 11 is connected by suitable conduit 12 to a mixing chamber 13 fitted with a stirrer 14 or other agitating means. Stirrer 14 is rotated on its shaft 15 by means of motor means 16, such as an air motor, electric motor or the like. The aqueous solution of anionic detergent is introduced through a conduit 17 by means of a suitable pump means 18 to the mixing chamber.

The immiscible organic solvent phase containing the amine anion exchange material is introduced through a conduit 19 by means of suitable pump means 20 to the mixing chamber. The rate of flow of the aqueous phase in most cases is substantially greater than the rate of flow of the immiscible organic solvent phase. However, as indicated above, this may vary widely. The extraction of the anionic detergent by the amine anion exchange material occurs primarily in the agitating mixer. The mixed aqueous-organic phases are forced through conduit 12 into the vertical column 10 and there separate into a lower aqueous and an upper non-aqueous organic layer.

The top of column 10 is provided with a collection chamber 21 for the accumulation of the separated non-aqueous layer. The chamber 21 is provided with an air vent 22 and a conduit 23 for continuously drawing off the topmost portion of the separated non-aqueous layer. The bottom of column 10 is provided with a conduit 24 for drawing off the aqueous layer from which the anionic detergent has been extracted and from which the immiscible organic phase has separated. The water immiscible material withdrawn from the top of the column is stripped of the extracted anionic detergent and recirculated to conduit 19 for reintroduction into the system.

Stripping of the organic solvent phase is accomplished in an auxiliary system which includes an elongated vertical column 25 provided with a T connector 26 intermediate of its ends which functions as a material inlet. Inlet 26 is connected by means of a suitable conduit 27 to a mixing chamber 28 fitted with a stirrer 29 or other agitating means. Stirrer 29 is rotated on its shaft 30 by motor means 31. The organic solvent phase containing the amine anion exchanger and extracted anionic detergent is introduced from the extraction column 10 to the mixer 28 through conduit 23 by means of a suitable pump 32.

The stripping solution is introduced to the mixer through a conduit 33 by means of a pump 34. The stripping of the organic phase occurs primarily in the agitating mixer 28. The mixed aqueous and organic phases are forced through conduit 27 into the vertical column 25 and there separate into a lower aqueous and upper non-aqueous organic layer. the top of column 25 is provided with a collection chamber 35 for the accumulation of the separated organic phase containing the anion exchanger. The chamber 35 is provided with an air vent 36.

The topmost portion of the separated organic layer is continuously drawn off into conduit 19 for reintroduction to the mixing chamber 13 for further extraction of anionic detergent. The bottom of column 25 is provided with a conduit 37 for drawing off the aqueous layer containing the extracted anionic detergent. It may be desirable to recover and concentrate the anionic detergent for reuse. For example, if the removed material is an alkyl aryl sulfonate, it may be recovered for industrial cleaning purposes and thereby assist in defraying the costs of the removal treatment.

The described and illustrated apparatus is, of course, only representative of one type of apparatus which may be used. The process may be carried out in any kind of apparatus, of whatever size, which provides for mixing of the organic and aqueous phases and a separation chamber. Optionally the apparatus may include means for mixing the loaded organic with the stripping agent and subsequent separation and recycling means. Obviously, as many extraction and stripping stages may be employed as necessary.

The invention is further described by the following examples. The examples are illustrative only and do not constitute limitations on the invention.

Example I

A 100 parts per million solution of sodium dodecylbenzene sulfonate was prepared and acidified to 0.05 N with sulfuric acid. An equal amount of a 200 parts per million solution of tricaprylyl amine (Alamine 336—a tertiary alkyl amine in which the alkyl groups are straight chain hydrocarbon groups containing principally 8 and 10 carbon atoms with a minimum amount of 12 carbon atom atom alkyl groups) in kerosene was mixed with the aqueous solution and agitated. Upon agitation practically no foam was formed showing substantial reduction in the concentration of the detergent. Although this test is qualitative it is quite conclusive because the formation of foam is a very sensitive method for detecting this kind of detergent and indicates reduction of concentration at least to below about 20 parts per million.

Example II

In further studies aqueous solutions of sodium dodecylbenzene sulfonate were made up in varying concentration of about 10, 20, 30, 40, and 50 parts per million respectively. The solutions were acidified to pH 3. Each solution was agitated in admixture with 1½ volumes of a solution of tricaprylyl amine (Alamine 336) in kerosene in concentration of 0.1 M, or about 3.7%. In each instance, colormetric analysis indicated quantitative extraction of sodium dodecylbenzene sulfonate from the aqueous solutions.

As a control, to determine that the extraction of sodium dodecylbenzene sulfonate was due to the amine present, rather than the organic solvent, solutions of sodium dodecylbenzene sulfonate in concentrations of 32.5 parts per million and at pH of 1.9 were admixed and agitated with equal volumes of kerosene and benzene. In each instance, after separation of the aqueous and organic phases, it was determined that all of the original sodium dodecylbenzene sulfonate remained in the aqueous phase establishing that the extraction is due to the amine present.

Example III

The effect of pH on the extraction of detergents by amines was studied by preparing the aqueous solutions of sodium dodecylbenzene sulfonate at various pH values in concentration of 100 parts per million and extracting with a 1000 parts per million solution of tricaprylyl amine (Alamine 336) in kerosene. The aqueous solutions were agitated in contact with the amine in kerosene. After separation of the organic phase from the aqueous phase, the organic phase was stripped by agitating it in a single batch extraction in contact with a 0.44 N sodium hydroxide solution. The results are summarized in the table:

| Sample | Equil. pH | Detergent Conc. Orig. | Detergent Conc. Final | Percent Extracted |
|---|---|---|---|---|
| 1 | 7.3 | 100 | 70 | 30 |
| 2 | 6.2 | 100 | 13.5 | 87 |
| 3 | 3.8 | 100 | 15.0 | 85 |
| 4 | 3.5 | 100 | 7.5 | 93 |
| 5 | 3.2 | 100 | 17.5 | 83 |
| 6 | 3.1 | 100 | 3.5 | 97 |

The results show that efficiency of extraction increases with increasing acidity. The stripping data show an average of 85% of the detergent in these various organic phases was stripped. The results also show efficient stripping as the amount of detergent in the organic phase increases.

Example IV

In order to study the stripping of anionic detergents from the organic phase containing the detergent extracted from an aqueous solution a number of different stripping agents were tested. Equal volumes of an aqueous 0.01 M solution of sodium dodecylbenzene sulfonate at a pH of 1.0 and 0.11 M tricaprylyl amine (Alamine 336) in kerosene were admixed and agitated together vigorously and the organic phase was removed for stripping studies. No detergent remained in the aqueous layer. The organic phase concentration with respect to the detergent was 0.01 M or 3480 parts per million. The following buffered stripping solutions were tested:

(1) 1.0 M sodium hydroxide; 0.4 M citric acid; pH value 5.6.
(2) 0.7 M sodium hydroxide; 0.4 M citric acid; pH value 4.5.
(3) 1.0 M sodium hydroxide; 0.4 M phosphoric acid; pH value 11.6.
(4) 0.7 M sodium hydroxide; 0.4 M phosphoric acid; pH value 7.3.

Equal portions of these solutions were admixed with agitation with portions of the organic phase containing the extracted detergent. After this treatment, the organic phase in all cases was barren of detergent. The results show that even dilute caustic when properly buffered will successfully strip the detergent from the loaded organic phase.

Example V

In further stripping studies, an aqueous solution of 0.01 M (3480 parts per million) sodium dodecylbenzene sulfonate was adjusted to a pH of 2.5 with sulfuric acid. This solution was extracted with an equal volume of 0.027 M tricaprylyl amine (Alamine 336) in kerosene. The following stripping agents were tested and found effective for removing the extracted detergent material from the organic phase:

(1) 0.04 N barium hydroxide.
(2) 0.045 N calcium hydroxide.
(3) 0.04 N soda lime.
(4) 0.045 N sodium hydroxide.
(5) Ammonia-ammonium chloride buffer; pH value 8.9.

Where a divalent metal stripping agent is employed, the resulting metal salt of the detergent is insoluble and is constantly removed from the water phase of the stripping system.

Example VI

Various amines and related materials were tested for their effectiveness in extracting anionic detergents from aqueous solution. Solutions of amines of 1000 parts per million in kerosene were prepared. Equal portions of these solutions were admixed with agitation with aqueous solutions of sodium dodecylbenzene sulfonate. In the pH range from 5.5 to 8.9, a large branch chain primary amine extracted from 62 to 97% of the detergent. This solution was stripped by barium hydroxide. Other amines were tested for extraction of the detergent. Equal portions of the solutions (1000 parts per million in kerosene) were shaken with the detergent solution at various pH values to produce the results summarized in the table:

|  | Detergent Conc., p.p.m. | | Equil. pH |
|---|---|---|---|
|  | Orig. | Final |  |
| Secondary hydrogenated tallow amine (Alamine H226) | 28 | 0 | 8.0 |
|  | 55 | 0 | 6.5 |
|  | 83 | 0 | 6.8 |
|  | 111 | 0 | 3.7 |
| Primary tallow amine (Alamine 26) | 28 | 0 | 8.4 |
|  | 55 | 0 | 7.6 |
|  | 83 | 0 | 8.1 |
|  | 111 | 0 | 8.3 |
| Acetate of primary tallow amine (Alamac 26) | 28 | 0 | 4.7 |
|  | 55 | 0 | 4.7 |
|  | 83 | 0 | 4.8 |
|  | 111 | 0 | 4.9 |

The equilibrium pH varies depending upon the basicity of the amine, its water solubility and the amount of hydrogen ion extracted.

Following the same procedures β - hydroxydodecyl dinonyl amine and 9(10) - dodecylamine - 10(9) - hydroxystearonitrile extracted sodium dodecylbenzene sulfonate quantitatively from aqueous media. The hydroxy amine was very effective at pH values below 6.7.

A secondary tallow amine (Alamine 226) in kerosene in 0.07 N normal solution was agitated with portions of an unbuffered 1000 parts per million solution of sodium dodecylbenzene sulfonate. The detergent was effectively extracted even under slightly basic conditions.

Example VII

Still further extraction and stripping studies were conducted. A 0.5% solution of tricaprylyl amine (Alamine 336) in isooctane was repeatedly agitated with portions of a 1000 parts per million aqueous solution of sodium dodecylbenzene sulfonate. Analysis showed that the loaded organic phase contained 2000 parts per million of detergent. Portions of the organic phase containing the extracted detergent were stripped by a variety of stripping agents. The results are summarized in the table:

| Stripping Agent | Conc. | Vol. Ratio, Aq./Organic | Amount of Detergent Stripped | |
|---|---|---|---|---|
|  |  |  | P.p.m. | Percent |
| Ba(OH)$_2$ | Sat. Soln | 0.5 | 1,700 | 85 |
| Ca(OH)$_2$ | Sat. Soln | 0.5 | 2,000 | 100 |
| NaOH | 1.73N | 0.5 | 2,000 | 100 |
| NH$_4$OH-NH$_4$Cl buffer, pH 8.7 | NH$_4$Cl 6N, NH$_4$OH 2N | 0.5 | 2,000 | 100 |
| Na$_2$CO$_3$ | 2 N | 0.5 | 2,000 | 100 |
| Na$_2$HPO$_4$-NaH$_2$PO$_4$ buffer, pH 7.1 | 1 Molar | 0.5 | 1,870 | 93 |
| NH$_4$Ac | 1 N | 0.5 | 1,780 | 89 |
| NaHCO$_3$-NaCl pH 8.7 | 1 Molar | 0.5 | 2,000 | 100 |
| Water |  | 0.5 | 0 | 0 |

The results show that a large variety of stripping agents, strong caustics, weak bases, basic buffers, etc. function effectively.

Example VIII

The role of pH value in the extraction of detergent by secondary tallow amine was studied further. A 4.86% solution of secondary tallow amine (Alamine 226) was prepared in isooctane. A 1000 parts per million (0.1%) solution of sodium dodecylbenzene sulfonate in water was prepared and portions of the two solutions were agitated in equal volumes at various equilibrium pH values. The results are summarized in the table:

| Equil. pH | Amount Detergent Extracted | |
|---|---|---|
|  | P.p.m. | Percent |
| 4.9 | 970 | 97 |
| 9.9 | 450 | 45 |
| 10.7 | 320 | 32 |
| 10.8 | 320 | 32 |
| 11 | 250 | 25 |

The results show that while extraction is effective at high equilibrium pH values, extraction is more efficient in acidic media.

Example IX

Continuous liquid ion exchange extraction of anionic detergents from aqueous solution was carried out as follows. As the water immiscible phase a 1.8% solution of secondary tallow amine (Alamine 226) in petroleum naphtha (Soltrol C) was prepared. The aqueous solution contained 20 parts per million of sodium dodecylbenzene sulfonate. The aqueous solution was pumped through the organic phase in a vertical column packed with beryl saddles. The continuous exchange process extracted 97.5% of the detergent from the aqueous phase.

Example X

In a further continuous extraction study an oil phase comprised of 1% secondary tallow amine in petroleum naphtha was pumped at a flow rate of 32 volumes per minute through a vertical column with continuous recycle. The aqueous phase containing 20 parts per million of sodium dodecylbenzene sulfonate was pumped at a flow rate of 22 volumes per minute. The oil phase was pumped countercurrent to the aqueous phase. This continuous extraction removed 91% of the detergent from the aqueous phase.

Example XI

The continuous extraction of detergent from raw sewage was studied. About 10 parts per million of sodium dodecylbenzene sulfonate were added to raw sewage collected just below the bar screen at the Anoka, Minnesota, sewage treating plant. The raw sewage with added detergents contained 23.8 parts per million of anionic detergent. The sewage was extracted in apparatus as shown in the drawing. The water immiscible phase was composed of a 1% solution of secondary tallow amine (Alamine 226) in isooctane. The raw sewage and organic phase were pumped together in the mixer. The aqueous flow rate averaged 1600 volumes per hour and the organic 35 volumes an hour to give an aqueous to oil ratio of about 45:1. The stirrer was operated at about 450 r.p.m. to supply rather moderate agitation. The original pH of the sewage was 7.6. This was relatively unchanged during the extraction. Samples of effluent sewage were collected at intervals for analysis. The average results of analyses indicated extraction of from 90 to 93% of the total detergent content of the sewage. The results illustrate the ready applicability and effectiveness of the liquid ion exchange process for extraction of detergents from sewage. No difficulties were encountered with emulsion formation, entrainment or slow phase separation.

*Example XII*

Since a very small amount of the amine ion exchanger and the organic solvent may be entrained the possible effect of this on bacterial purification was studied. Emulsions were prepared in water containing respectively, 100 parts per million of secondary tallow amine (Alamine 226) together with 1.25% isooctane; 200 parts per million of secondary tallow amine together with 2.5% isooctane; and 500 parts per million of secondary tallow amine together with 6.2% kerosene. Also a suspension of about 200 parts per million of secondary tallow amine was prepared in water by peptizing 0.1 gram of the amine with 1 cc. of ethanol and adding 500 ml. of water. These were submitted for testing with gram positive and gram negative cultures (*E. coli* and *M. pyogenes*). None of the suspensions exhibited bactericidal activities although these levels are far above anything that would be encountered in actual practice. Therefore, it is determined that the minute entrainment of the amine anion exchanger and/or the organic solvent has no adverse effects on subsequent biological treatments to which the sewage might be subjected. The actual solubility of secondary tallow amine in water has been shown to be below one part per million.

*Example XIII*

A 0.5% solution of tricaprylyl amine (Alamine 336) in isooctane was admixed and agitated with three fresh, equal portions of 1000 p.p.m. dodecylbenzene sulfonate in water. The loaded organic phase then contained 2000 p.p.m. of the detergent complexed with the amine. This loaded organic phase was stripped with a variety of reagents. The results were:

| Stripping Agent | Conc. | Vol. Ratio, Aq./Org. | Percent Detergent Stripped |
|---|---|---|---|
| $CH_3NH_2$ | 40% | ½ | 96 |
| $NaClO_4$ | 1.2 M | ½ | 38 |
| $CaCl_2$ | 1.0 M | ½ | 2 |
| $H_2SO_4$ | 12 N | ½ | 10 |
| Soda Lime | Solid (in excess) | | 83 |

These results show that in addition to aqueous bases, organic materials (methylamine), salts, and strong acids are effective stripping agents. In addition, the stripping agent may be a solid with which the immiscible (oil) phase is mixed, or through which it is percolated.

*Example XIV*

A 99 p.p.m. solution of sodium lauryl sulfate was adjusted to various pH values with sulfuric acid and extracted with an organic solution consisting of 1% tricaprylyl amine (Alamine 336) in kerosene. Volume ratios were unity, the results were:

| Equil. pH: | Percent sodium lauryl sulfate extracted |
|---|---|
| 7.5 | 92 |
| 4.7 | 95 |
| 3.0 | 100 |
| 2.5 | 100 |
| 1.9 | 100 |

These results show that anionic detergents in general can be extracted by the method of the present invention.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A process which comprises contacting an aqueous solution of an organic anionic detergent with a liquid organic phase comprising a water-immiscible organic solvent and a water immiscible amine anion exchange material containing a total of more than about 10 carbon atoms selected from the group consisting of amines having the formula

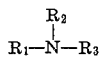

where $R_1$ is selected from the group consisting of aliphatic and aromatic radicals of 6 to 24 carbon atoms and $R_2$ and $R_3$ are selected from the group consisting of hydrogen and hydrocarbon radicals of 1 to 24 carbon atoms to extract at least a portion of the organic anionic detergent into the organic phase and separating the loaded organic phase from the aqueous phase.

2. The process of claim 1 wherein the aqueous solution is a waste solution selected from the group consisting of launderette effluents and sewage water.

3. The process of claim 1 wherein the aqueous solution is acidified to promote extraction.

4. The process of claim 1 wherein at least a portion of the organic anionic detergent is a sulfonate.

5. The process of claim 4 wherein the sulfonate is sodium dodecyl benzene sulfonate.

6. The process of claim 1 wherein the aqueous solution and organic phase are agitated during the contacting thereof.

7. The process of claim 1 wherein the water-immiscible solvent is a hydrocarbon solvent.

8. The process of claim 1 wherein at least one of the radicals $R_1$, $R_2$, and $R_3$ is an alkyl group.

9. The process of claim 1 wherein the complex of the extracted organic anionic detergent is stripped from the loaded organic phase with a stripping agent selected from the group consisting of aqueous solutions of bases, acids and salts and solid stripping agents caustic in nature.

10. The process of claim 9 wherein the stripped organic phase is continuously recycled for further extraction of organic anionic detergents from aqueous solutions.

11. The process of continuously removing organic anionic detergents from aqueous waste solutions which comprises intimately contacting said waste solutions with an organic phase comprising a water-immiscible solvent and an amine anion exchanger having from 1 to 3 alkyl chains containing a total of at least about 10 carbon atoms to extract at least a portion of the organic anionic detergents into the organic phase, separating the immiscible organic phase from the treated aqueous waste solution, intimately contacting the separated immiscible organic phase with a stripping agent to strip the extracted organic anionic detergents therefrom and separating the stripped organic phase for recycling for treatment of further aqueous waste solution.

12. The process of claim 1 wherein the water-immiscible amine anion exchange material is dioleyl amine.

References Cited by the Examiner

Fairling et al.: Analytical Chem., vol. 28, July-December 1956, pp. 1827–1834 relied upon.

Schwartz et al.: Surface Active Agents, Chemistry and Technology, copyright 1949 by Interscience Publishers, Inc., New York, pp. 151–153 relied upon.

MORRIS O. WOLK, *Primary Examiner.*

JOSEPH SCOVRONEK, *Examiner.*